United States Patent
Fang et al.

(10) Patent No.: US 9,266,097 B2
(45) Date of Patent: Feb. 23, 2016

(54) COBALT-BASED NANO CATALYST AND PREPARATION METHOD THEREOF

(71) Applicant: WUHAN KAIDI ENGINEERING TECHNOLOGY RESEARCH INSTITUTE CO., LTD., Wuhan (CN)

(72) Inventors: Zhangjian Fang, Wuhan (CN); Yilong Chen, Wuhan (CN); Yanfeng Zhang, Wuhan (CN); Xiaodong Zhan, Wuhan (CN); Yongjie Xue, Wuhan (CN); Leiming Tao, Wuhan (CN)

(73) Assignee: Wuhan Kaidi Engineering Technology Research Institute Co., Ltd., Wuhan (CN)

( * ) Notice: Subject to any disclaimer, the term of this patent is extended or adjusted under 35 U.S.C. 154(b) by 0 days.

(21) Appl. No.: 14/285,665

(22) Filed: May 23, 2014

(65) Prior Publication Data

US 2014/0256535 A1 Sep. 11, 2014

Related U.S. Application Data

(63) Continuation-in-part of application No. PCT/CN2012/083091, filed on Oct. 17, 2012.

(30) Foreign Application Priority Data

Nov. 24, 2011 (CN) .......................... 2011 1 0378794

(51) Int. Cl.
*B01J 21/00* (2006.01)
*B01J 21/04* (2006.01)
(Continued)

(52) U.S. Cl.
CPC ............ *B01J 23/894* (2013.01); *B01J 23/8896* (2013.01); *B01J 23/8913* (2013.01); *B01J 35/006* (2013.01); *B01J 35/008* (2013.01); *B01J 35/0086* (2013.01); *B01J 35/08* (2013.01); *B01J 35/1019* (2013.01); *B01J 35/1057* (2013.01);
(Continued)

(58) Field of Classification Search
CPC ............ B01J 21/04; B01J 21/08; B01J 23/10; B01J 23/75; B01J 23/83; B01J 23/8913; B01J 23/8914; B01J 35/002; B01J 35/08; B01J 35/10
USPC .......... 502/260, 303–304, 326, 327, 332, 339, 502/349, 355, 439
See application file for complete search history.

(56) References Cited

U.S. PATENT DOCUMENTS 6,458,741 B1 * 10/2002 Roark ....................... A62D 3/38
423/245.3
8,475,921 B2 * 7/2013 Kayama ............... B01D 53/944
428/403

(Continued)

*Primary Examiner* — Cam N. Nguyen
(74) *Attorney, Agent, or Firm* — Matthias Scholl P.C.; Matthias Scholl

(57) ABSTRACT

A cobalt-based nano catalyst including a metal combination as a core and a porous material as a shell. The metal combination includes a first metal component Co, a second metal component selected from Ce, La, and Zr, and a third metal component selected from Pt, Ru, Rh, and Re. The catalyst includes between 10 and 35 wt. % of the first metal component, between 0.5 and 10 wt. % of the second metal component, between 0.02 and 2 wt. % of the third metal component, and a carrier. The carrier is a porous material such as nano silica or alumina. The carrier is in the shape of a spheroid, has a pore size of between 1 and 20 nm and a specific area of between 300 and 500 m$^2$/g. The active component of the catalyst has a particle size of between 0.5 and 20 nm.

13 Claims, 1 Drawing Sheet

(51) Int. Cl.
  *B01J 23/00* (2006.01)
  *B01J 23/02* (2006.01)
  *B01J 23/10* (2006.01)
  *B01J 23/40* (2006.01)
  *B01J 23/42* (2006.01)
  *B01J 23/44* (2006.01)
  *B01J 23/56* (2006.01)
  *B01J 23/89* (2006.01)
  *B01J 37/00* (2006.01)
  *C10G 2/00* (2006.01)
  *B01J 37/03* (2006.01)
  *B01J 23/889* (2006.01)
  *B01J 35/00* (2006.01)
  *B01J 35/08* (2006.01)
  *B01J 35/10* (2006.01)

(52) U.S. Cl.
  CPC .............. *B01J 35/1061* (2013.01); *B01J 37/00* (2013.01); *B01J 37/0018* (2013.01); *B01J 37/0045* (2013.01); *B01J 37/036* (2013.01); *C10G 2/00* (2013.01); *C10G 2400/04* (2013.01)

(56) References Cited

U.S. PATENT DOCUMENTS

2011/0311635 A1* 12/2011 Stucky ..................... B01J 13/02
  424/490
2012/0125856 A1* 5/2012 Grandjean ............. G21F 9/305
  210/682

* cited by examiner

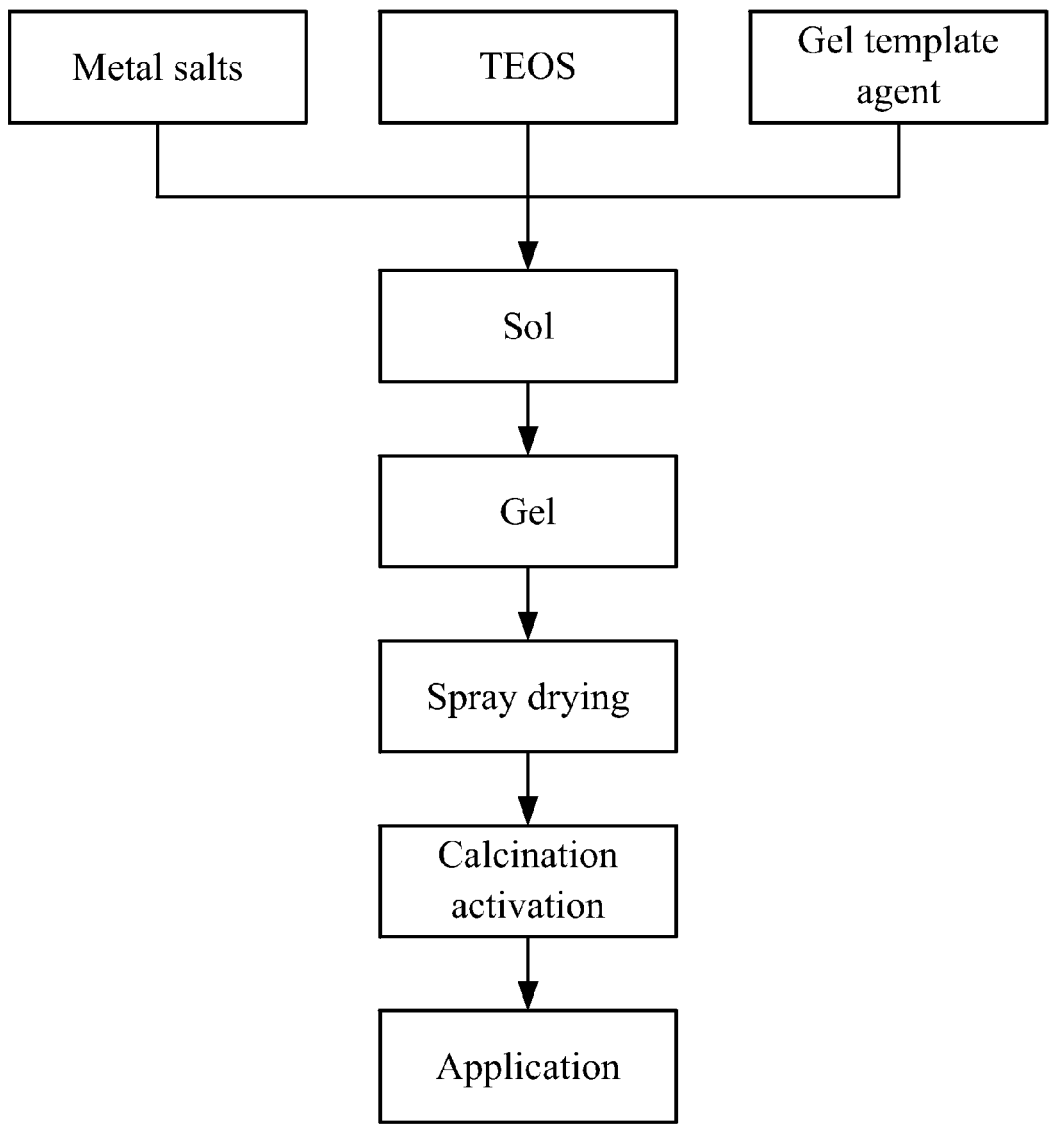

COBALT-BASED NANO CATALYST AND PREPARATION METHOD THEREOF

CROSS-REFERENCE TO RELATED APPLICATIONS

This application is a continuation-in-part of International Patent Application No. PCT/CN2012/083091 with an international filing date of Oct. 17, 2012, designating the United States, now abandoned as to the United States, and further claims priority benefits to Chinese Patent Application No. 201110378794.1 filed Nov. 24, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to the field of catalytic synthesis and nano-material, and more particularly to a cobalt-based nano catalyst for Fischer-Tropsch synthesis and a preparation method thereof.

2. Description of the Related Art

Fischer-Tropsch synthesis is a chemical process involving a variety of chemical reactions in the presence of catalysts to produce hydrocarbons from syngas ($CO+H_2$). The products are mainly heavy hydrocarbons ($C_{5+}$) having a relatively high carbon number, which are clean motor fuel almost free of contamination of sulfides and nitrides.

The factors related to reaction mechanism of Fischer-Tropsch synthesis include the type, size, dispersity, and reducibility of active metal particles, channeling effect of carrier (confinement effect and shape-selective effect, etc.), and promotion effect of additives. The factors affect the reactive process, and then affect the reactivity and the type and distribution of the product. Studies have shown that the dispersity of active components, active center structure, microenvironment, location, and channeling structure of carriers have a great effect on the activity and selectivity in conversion reaction of syngas. Conventional methods for preparing a catalyst for Fischer-Tropsch synthesis have a complicated process, a low CO conversion rate, and the involved raw materials are expensive. The resulting catalyst has a single metal component, the active center thereof is easy to agglomerate and thus inactive. The reaction products are mainly light hydrocarbons with high methane selectivity.

Microcapsular reactor is a new concept in nano-assembly and catalysis in recent years, which addresses the problem in traditional catalyst of being difficult to recycle as well as poor stability and selectivity. In this reactor, not only guest molecules can selectively enter the capsular space to react with reactive species in the capsule, but also its products can selectively disperse out of the reactor.

SUMMARY OF THE INVENTION

In view of the above-described problems, it is one objective of the invention to provide a cobalt-based nano catalyst for Fischer-Tropsch synthesis and a preparation method thereof. The preparation method of the catalyst is simple, the production costs are low, the selectivity for methane is low, the activity of the catalytic reaction is high, and the selectivity for $C_{5+}$ is good. The diesel and the paraffin are the main products.

To achieve the above objective, in accordance with one embodiment of the invention, there is provided a cobalt-based nano catalyst, the catalyst is prepared by a sol-gel method using an organogel as a template. The catalyst comprises a metal combination as a core and a porous material as a shell. The metal combination comprises: a first metal component being Co, a second metal component being selected from Ce, La, and Zr, and a third metal component being selected from Pt, Ru, Rh, and Re. The catalyst comprises: between 10 and 35 wt. % of the first metal component, between 0.5 and 10 wt. % of the second metal component, and between 0.02 and 2 wt. % of the third metal component, and a carrier. The carrier is the porous material being a nano silica or alumina; the carrier is in the shape of a spheroid, and has a pore size of between 1 and 20 nm and a specific area of between 300 and 500 $m^2/g$. An active component of the catalyst has a particle size of between 0.5 and 20 nm.

In a class of this embodiment, the catalyst comprises: between 15 and 30 wt. % of the first metal component, between 1 and 5 wt. % of the second metal component, and between 0.05 and 2 wt. % of the third metal component, and the carrier.

In a class of this embodiment, to obtain a product primarily comprising light hydrocarbons, the carrier has the pore size of between 1 and 10 nm and the specific area of between 300 and 400 $m^2/g$; and the active component has the particle size of between 0.5 and 5 nm.

In a class of this embodiment, to obtain a product primarily comprising middle distillates ($C_5$-$C_{18}$), the carrier has the pore size of between 10 and 15 nm, and the specific area of between 400 and 500 $m^2/g$; and the active component has the particle size of between 6 and 15 nm.

In a class of this embodiment, to obtain a product comprising a relatively high content of $C_{18+}$, the carrier has the pore size of between 10 and 20 nm and the specific area of between 400 and 500 $m^2/g$; and the active component has the particle size of between 16 and 20 nm.

A method for preparing the catalyst for Fischer-Tropsch synthesis comprises the following steps:

1) weighing tetraethyl orthosilicate (TEOS) or aluminum nitrate, a water-soluble salt containing the first metal component Co, a nitrate or a nitrosyl nitrate containing the second metal component, a nitrate or a nitrosyl nitrate containing the third metal component, and a gel template agent according to the corresponding weight percentages of each component;

2) dissolving the gel template agent in a polar solvent to yield a first solution, adding the water-soluble salt containing the first metal component Co, the nitrate or the nitrosyl nitrate containing the second metal component, and the nitrate or the nitrosyl nitrate containing the third metal component to the first solution at a constant temperature, adding appropriate amount of ammonia to adjust the pH value to between 8 and 10, and stirring at the constant temperature for between 0.1 and 3 hr to yield a second solution;

3) adding TEOS or aluminum nitrate to the second solution and continuing stirring for between 3 and 24 hr at the constant temperature to yield a mixture;

4) spray drying the mixture at the temperature of between 90 and 150° C., whereby obtaining an organic-inorganic hybrid material in the form of powder; and 5) transferring the powder after the spray drying to a muffle furnace, calcining the powder at a temperature of between 300 and 753° C. for between 3 and 12 hr, whereby yielding the catalyst.

In a class of this embodiment, in step 4), a gel prepared in step 3) is spray dried at the temperature of between 110 and 150° C. to yield the organic-inorganic hybrid material.

In a class of this embodiment, in step 5), the powder is calcined at the temperature of between 350 and 753° C. for between 5 and 10 hr for yielding the finished catalyst.

In a class of this embodiment, the gel template agent is a linear amphiphilic polymer containing an amino group.

In a class of this embodiment, the water-soluble salt containing the first metal component Co is cobalt nitrate, cobalt acetate, or cobalt carbonate. The salt containing the second metal component is a nitrate thereof. The salt containing the third metal component is a nitrate thereof.

Advantages according to embodiments of the invention are summarized as follows:

1. Co is an essential active metal in the catalyst for Fischer-Tropsch synthesis. Theoretically, with the same dispersity, the higher the Co content is, the more active the catalyst will be. However, factors such as specific surface area, pore diameter and channel will restrain the maximum load of Co; and if Co is overloaded, it will be easy to agglomerate, then to reduce catalyst activity on the contrary. Thus, those ordinary skilled in the art have been attempting to add additives to improve the dispersity of Co on catalyst carrier to improve Co catalysis as much as possible. In the present invention, nanoporous catalyst whose shape, particle diameter and pore diameter are controllable can be obtained by choosing proper organogel template, reaction time and reactant weight. Because active components will disperse evenly in the porous material, they cannot be agglomerated, thereby improving the activity of the catalyst and the selectivity of the reaction product. Meanwhile, the activity and selectivity of the catalyst are further improved by adding the additives. In this way, the content of active components will be reduced so as to decrease the production costs of the catalyst. This catalyst is suitable for slurry bubble column reactor and continuous stirred slurry reactor.

2. The range of Fischer-Tropsch synthesis products is wide from methane to paraffin with high molecular weight, so poor selectivity is a defect in this process. The activity and product selectivity of Fischer-Tropsch synthesis are significantly changed by the cobalt particle size in the catalytic material. The product distribution is modified in the invention by selecting the porous material having the specific pore diameter and the specific surface area as the carrier, and the diesel and paraffin in the products have higher selectivity. According to our study, the core in core-shell structured nano catalyst is active in catalysis, while the shell makes the core stable. And the closed space of the shell forms a microenvironment where the reactant can accumulate to achieve high local concentration to promote efficient reaction so as to improve overall activity of the catalyst and product selectivity, and to enhance the property of anti-carbon, anti-sintering and hydrothermal stability, etc. When the particle diameter is between 0.5 and 20 nm, and the specific surface area is between 300 and 500 $m^2/g$, it is easier to produce diesel and paraffin.

3. The cobalt-based nano catalyst confined by porous material in the invention is in-situ synthesized by sol gel process, so the active components of the catalyst and the porous material used as carrier can be synthesized simultaneously, thereby simplifying the preparation process, being convenient for operation and applicable for industrial production.

The new catalyst in the invention combines the advantages of the catalyst preparation process in micro-capsular reactor and of the nano catalyst confined by porous material. It uses organic gel as the complete, on the surface of which the active components grow. The core-shell structured cobalt-based porous catalyst designed and prepared has high activity, with low selectivity for methane, and its main products are diesel and paraffin. Compared to the patent CN 101698152A, it is easier for the active components in the catalyst to evenly disperse on the porous carrier so as to achieve high material activity, CO conversion rate and low methane selectivity. At the same time, the high catalysis can be realized by adding only a small amount of precious metal additives, thereby decreasing the production cost.

BRIEF DESCRIPTION OF THE DRAWINGS

The invention is described hereinbelow with reference to accompanying drawings, in which the sole FIGURE is a flow chart of a method for preparing a cobalt-based nano catalyst for Fischer-Tropsch synthesis according to one embodiment of the invention.

DETAILED DESCRIPTION OF THE EMBODIMENTS

A cobalt-based nano catalyst for Fischer-Tropsch synthesis is prepared by a sol-gel method using an organogel as a template. The catalyst comprises a metal combination as a core and a porous material as a shell. The metal combination comprises: a first metal component being Co, a second metal component being selected from Ce, La, and Zr, and a third metal component being selected from Pt, Ru, Rh, and Re. The catalyst comprises: between 10 and 35 wt. % of the first metal component, between 0.5 and 10 wt. % of the second metal component, and between 0.02 and 2 wt. % of the third metal component, and a carrier. The carrier is a porous material which is a nano silica or alumina. The carrier is in the shape of a spheroid; the porous material has a pore size of between 1 and 20 nm and a specific area of between 300 and 500 $m^2/g$. An active component has a particle size of between 0.5 and 20 nm.

Preferably, the catalyst comprises: between 15 and 30 wt. % of the first metal component, between 1 and 5 wt. % of the second metal component, and between 0.05 and 2 wt. % of the third metal component, and the carrier.

Preferably, to obtain a product primarily comprising light hydrocarbons, the carrier has the pore size of between 1 and 10 nm and the specific area of between 300 and 400 $m^2/g$; and the active component has the particle size of between 0.5 and 5 nm.

Preferably, to obtain a product primarily comprising a middle distillate ($C_5$-$C_{18}$), the carrier has the pore size of between 10 and 15 nm, and the specific area of between 400 and 500 $m^2/g$; and the active component has the particle size of between 6 and 15 nm.

Preferably, to obtain a product with a relatively high content of $C_{18+}$, the carrier has the pore size of between 10 and 20 nm and the specific area of between 400 and 500 $m^2/g$; and the active component has the particle size of between 16 and 20 nm.

A method for preparing the cobalt-based nano catalyst for Fischer-Tropsch synthesis comprises the following steps:

1) selecting raw materials: weighing tetraethyl orthosilicate (TEOS) or aluminum nitrate, a water-soluble salt containing the first metal component Co, a nitrate or a nitrosyl nitrate containing the second metal component, a nitrate or a nitrosyl nitrate containing the third metal component, and a gel template agent according to the corresponding weight percentages of each component;

2) dissolving the gel template agent in a polar solvent to yield a first solution, adding the water-soluble salt containing the first metal component Co, the nitrate or the nitrosyl nitrate containing the second metal component, and the nitrate or the nitrosyl nitrate containing the third metal component to the first solution at a constant temperature, adding appropriate amount of ammonia to adjust the pH value to between 8 and 10, and stirring at the constant temperature for between 0.1 and 3 hr to yield a second solution;

3) adding TEOS or aluminum nitrate to the second solution and continuing stirring for between 3 and 24 hr at the constant temperature to yield a mixture;

4) spray drying the mixture at the temperature of between 90 and 150° C., whereby obtaining an organic-inorganic hybrid material in the form of powder; and 5) transferring the powder after the spray drying to a muffle furnace, calcining the powder at a temperature of between 300 and 753° C. for between 3 and 12 hr, whereby yielding the finished catalyst.

Preferably, in step 4), the gel prepared by the sol-gel template method is spray dried at the temperature of between 110 and 150° C. to yield the organic-inorganic hybrid material.

Preferably, in step 5), the powder after the spray drying is transferred to the muffle furnace and calcined at the temperature of between 350 and 753° C. for between 5 and 10 hr for yielding the finished catalyst.

Preferably, the gel template agent is a linear amphiphilic polymer containing an amino group.

Preferably, in preparation of the aqueous solution, water-soluble salt containing the first metal component Co is cobalt nitrate, cobalt acetate, or cobalt carbonate. The salt containing the second metal component is a nitrate thereof. The salt containing the third metal component is a nitrate thereof.

To specifically illustrate the invention, the main content of the invention is further explained combined with FIG. 1 and the following examples, but the content of the invention is not limited by the examples.

EXAMPLE 1

20 g of polyethyleneimine (PEI) was collected and dissolved in 100 mL of ethanol at the temperature of 80° C. to yield a solvent. Thereafter, to 100 mL of deionized water, 93.8 g of cobalt nitrate hexahydrate, 39.1 g of lanthanum nitrate hexahydrate, and 2.32 g of platinum nitrate were added and stirred for dissolving thereof to yield an aqueous solution. The aqueous solution and the solvent were then evenly mixed, added with 5 mL of ammonia, and stirred at the constant temperature for 2 hr to yield a reaction solution. TEOS of a calculated amount was added to the reaction solution and stirred at the room temperature overnight to yield a mixture. Thereafter, the mixture was spray dried to yield powder. The powder was then transferred to a muffled furnace and dried for 6 hr after the temperature slowly climbed to 400° C., whereby yielding a Fischer-Tropsch synthesis cobalt nano catalyst based on porous material confinement. Components of the nano catalyst were as follows: $Co:La:Pt:SiO_2=15:10:0.5:74.5$.

Activation of the nano catalyst was performed in a pressurized fixed bed reactor as follows: 100 g of the nano catalyst was placed in the reactor. Pure $H_2$ (the purity>99.9%) was used as a reducing gas and a volume velocity thereof was controlled at 1000 $h^{-1}$; a heating rate was controlled at 2° C./min, an activation temperature was controlled at 350° C., an activation pressure was controlled at 0.5 megapascal, and an activation time was 4 hr.

Catalytic reaction was performed in a slurry bed reactor as follows: 50 g of the activated catalyst was transferred to the slurry bed reactor in an anhydrous oxygen-free condition. Polyolefin was used as a reaction medium. A synthesis gas was introduced, in which, $H_2:CO=1.5$. A flow rate of the synthesis gas was controlled to allow the volume velocity thereof to be 1000 $h^{-1}$, and the pressure in the reactor was controlled to be 3.0 megapascal. A heating program was set to increase the reaction temperature at a rate of 3° C./min to 150° C. and then continue increasing the reaction temperature at a rate of 2° C./min until 220° C., where the reaction was performed. Selectivity (wt. %) of the product was as follows: $C_1$, 6.1; $C_{2-4}$, 7.3; $C_{5-11}$, 32.2; $C_{12-18}$, 29.5; $C_{18+}$, 24.9. Conversion rate of CO reached 81.5.

EXAMPLE 2

20 g of PEI was collected and dissolved in 100 mL of ethanol at the temperature of 80° C. to yield a solvent. Thereafter, to 100 mL of deionized water, 53.6 g of cobalt nitrate hexahydrate, 1.7 g of cerium nitrate hexahydrate, and 5.9 g of ruthenium nitrosyl nitrate were added and stirred for dissolving thereof to yield an aqueous solution. The aqueous solution and the solvent were then evenly mixed and stirred at the constant temperature for 2 hr to yield a reaction solution. Aluminum nitrate of a calculated amount was added to the reaction solution and stirred at the room temperature overnight to yield a mixture. Thereafter, the mixture was spray dried to yield powder. The powder was then transferred to a muffled furnace and dried for 3 hr after the temperature slowly climbed to 550° C., whereby yielding a Fischer-Tropsch synthesis cobalt nano catalyst based on porous material confinement. Components of the catalyst were as follows: $Co:Ce:Ru:Al_2O_3=10:0.5:1.5:88$.

Activation of the catalyst was performed in a pressurized fixed bed reactor as follows: 100 g of the catalyst was placed in the reactor. Pure $H_2$ (the purity>99.9%) was used as a reducing gas and a volume velocity thereof was controlled at 1000$h^{-1}$; a heating rate was controlled at 2° C./min, an activation temperature was controlled at 350° C., an activation pressure was controlled at 1.5 megapascal, and an activation time was 4 hr.

Catalytic reaction was performed in a slurry bed reactor as follows: 50 g of the activated catalyst was transferred to the slurry bed reactor in an anhydrous oxygen-free condition. Polyolefin was used as a reaction medium. A synthesis gas was introduced, in which, $H_2:CO=1.5$. A flow rate of the synthesis gas was controlled to allow the volume velocity to be 1000 $h^{-1}$, and the pressure in the reactor was controlled to be 3.0 megapascal. A heating program was set to increase the reaction temperature at a rate of 3° C./min to 150° C. and then continue increasing the reaction temperature at a rate of 2° C./min until 220° C., where the reaction was performed. Selectivity (wt. %) of the product was as follows: $C_1$, 6.8; $C_{2-4}$, 7.9; $C_{5-11}$, 27.2; $C_{12-18}$, 28.6; $C_{18+}$, 29.5. Conversion rate of CO reached 85.3.

EXAMPLE 3

20 g of PEI was collected and dissolved in 100 mL of ethanol at the temperature of 80° C. to yield a solvent. Thereafter, to 100 mL of deionized water, 53.6 g of cobalt nitrate hexahydrate, 1.7 g of cerium nitrate hexahydrate, and 5.9 g of ruthenium nitrosyl nitrate were added and stirred for dissolving thereof to yield an aqueous solution. The aqueous solution and the solvent were then evenly mixed and stirred at the constant temperature for 2 hr to yield a reaction solution.

TEOS of a calculated amount was added to the reaction solution and stirred at the room temperature overnight to yield a mixture. Thereafter, the mixture was spray dried to yield powder. The powder was then transferred to a muffled furnace and dried for 3 hr after the temperature slowly climbed to 450° C., whereby yielding a Fischer-Tropsch synthesis cobalt nano catalyst based on porous material confinement. Components of the catalyst were as follows: Co:Ce:Ru:SiO$_2$=10:0.5:1.5:88.

Activation of the catalyst was performed in a pressurized fixed bed reactor as follows: 100 g of the catalyst was placed in the reactor. Pure H$_2$ (the purity>99.9%) was used as a reducing gas and a volume velocity thereof was controlled at 1000 h$^{-1}$; a heating rate was controlled at 2° C./min, an activation temperature was controlled at 350° C., an activation pressure was controlled at 1.5 megapascal, and an activation time was 4 hr.

Catalytic reaction was performed in a slurry bed reactor as follows: 50 g of the activated catalyst was transferred to the slurry bed reactor in an anhydrous oxygen-free condition. Polyolefin was used as a reaction medium. A synthesis gas was introduced, in which, H$_2$:CO=1.5. A flow rate of the synthesis gas was controlled to allow the volume velocity to be 1000 h$^{-1}$, and the pressure in the reactor was controlled to be 3.0 megapascal. A heating program was set to increase the reaction temperature at a rate of 3° C./min to 150° C. and then continue increasing the reaction temperature at a rate of 2° C./min until 220° C., where the reaction was performed. Selectivity (wt. %) of the product was as follows: C$_1$, 5.6; C$_{2-4}$, 7.1; C$_{5-11}$, 23.9; C$_{12-18}$, 29.8; C$_{18+}$, 33.6. Conversion rate of CO reached 76.3.

EXAMPLE 4

As a comparison, a method for preparing a cobalt-based catalyst for Fischer-Tropsch synthesis was disclosed in CN 101698152A as follows:

An adequate amount of Al$_2$O$_3$ carrier was added to a muffle furnace, calcined at a temperature of 550° C. for 4 hr, and 100 g of a resulting Al$_2$O$_3$ carrier was collected. To deionized water, 53.6 g of cobalt nitrate hexahydrate, 1.7 g of cerium nitrate hexahydrate, and 5.9 g of ruthenium nitrosyl nitrate were added and stirred for dissolving thereof, and a resulting solution was diluted to 110 mL to yield an aqueous solution. Thereafter, the aqueous solution was impregnated on the Al$_2$O$_3$ carrier of the calculated amount using a full pore impregnation method to yield an impregnated catalyst. The impregnated catalyst was vacuum dried in water bath at the temperature of 80° C., and then placed at the room temperature for aging for 24 hr. Thereafter, an aged catalyst was transferred to the muffle furnace, dried for 6 hr after the temperature slowly climbed to 120° C., and calcined for 8 hr after the temperature was increased to 500° C., whereby yielding the catalyst. Components of the catalyst were as follows: Co:Ce:Ru:Al$_2$O$_3$=10:0.5:1.5:88.

Activation of the catalyst was performed in a pressurized fixed bed reactor as follows: 100 g of the catalyst was placed in the reactor. Pure H$_2$ (the purity>99.9%) was used as a reducing gas and a volume velocity thereof was controlled at 1000 h$^{-1}$; a heating rate was controlled at 2° C./min, an activation temperature was controlled at 350° C., an activation pressure was controlled at 1.5 megapascal, and an activation time was 4 hr.

Catalytic reaction was performed in a slurry bed reactor as follows: 50 g of the activated catalyst was transferred to the slurry bed reactor in an anhydrous oxygen-free condition. Polyolefin was used as a reaction medium. A synthesis gas was introduced, in which, H$_2$:CO=1.5. A flow rate of the synthesis gas was controlled to allow the volume velocity to be 1000 h$^{-1}$, and the pressure in the reactor was controlled to be 3.0 megapascal. A heating program was set to increase the reaction temperature at a rate of 3° C./min to 150° C. and then continue increasing the reaction temperature at a rate of 2° C./min until 220° C., where the reaction was performed. Selectivity (wt. %) of the product was as follows: C$_1$, 9.3; C$_{2-4}$, 9.1; C$_{5-11}$, 27.8; C$_{12-18}$, 21.2; C$_{18+}$, 32.6. Conversion rate of CO reached 71.3.

It was known from Examples 1-3 that the catalyst prepared by the method according to embodiments of the invention had relatively high activity. In condition of 1000 h$^{-1}$ of the volume velocity, even the content of Co was only 10 wt. %, the convention rate of CO reached 80 wt. % above, which means effects of the metal components of the Fischer-Tropsch synthesis cobalt catalyst were obvious. In the above Examples, methane had relatively low selectivity, and C$_{5+}$ had good selectivity. Compared with Example 4, the catalyst prepared by the method of Example 2 had low production costs, selectivity of methane was relatively low, selectivity of C$_{5+}$ was better, and particularly selectivity of C$_{12+}$ was more advantageous.

EXAMPLES 5-12

According to embodiments of the invention, a plurality of cobalt-based nano catalysts for Fischer-Tropsch synthesis were prepared, and catalytic performances thereof were shown in Table 1.

TABLE 1

Catalytic performance of cobalt-based nano catalyst for Fischer-Tropsch synthesis

| Example | Catalyst components | Calcining temperature | Particle diameter of a core | Conversion rate of CO (%) |
|---|---|---|---|---|
| 1 | Co:La:Pt:SiO$_2$ = 15:10:0.5:74.5 | 450 | 12 | 81.5 |
| 2 | Co:Ce:Ru:Al$_2$O$_3$ = 10:0.5:1.5:88 | 550 | 15 | 85.3 |
| 3 | Co:Ce:Ru:SiO$_2$ = 10:0.5:1.5:88 | 450 | 17 | 71.3 |
| 5 | Co:Ce:Ru:SiO$_2$ = 10:0.5:1.5:88 | 400 | 3 | 90.6 |
| 6 | Co:La:Pt:Al$_2$O$_3$ = 15:10:0.5:74.5 | 550 | 8 | 87.4 |
| 7 | Co:Zr:Re:Al$_2$O$_3$ = 25:2:0.3:72.7 | 500 | 16 | 61.3 |
| 8 | Co:Zr:Re:SiO$_2$ = 25:2:0.3:72.7 | 400 | 2 | 92.6 |
| 9 | Co:La:Ru:Al$_2$O$_3$ = 35:10:0.5:54.5 | 550 | 20 | 65.8 |
| 10 | Co:La:Ru:SiO$_2$ = 35:10:0.5:54.5 | 400 | 1 | 93.7 |
| 11 | Co:La:Rh:SiO$_2$ = 20:5:0.3:74.7 | 400 | 5 | 81.3 |
| 12 | Co:La:Ru:Al$_2$O$_3$ = 20:5:0.3:74.7 | 550 | 10 | 51.3 |

| Example | Selectivity of hydrocarbon | | | | |
|---|---|---|---|---|---|
|  | C$_1$ | C$_{2-4}$ | C$_{5-11}$ | C$_{12-18}$ | C$_{18+}$ |
| 1 | 6.1 | 7.3 | 32.2 | 29.5 | 24.9 |
| 2 | 6.8 | 7.9 | 27.2 | 28.6 | 29.5 |
| 3 | 5.6 | 7.1 | 23.9 | 29.8 | 33.6 |
| 5 | 16.8 | 8.8 | 39.9 | 27.8 | 6.7 |
| 6 | 7.3 | 5.6 | 31.6 | 28.2 | 27.3 |
| 7 | 6.3 | 8.7 | 25.6 | 28.9 | 30.5 |
| 8 | 16.8 | 10.9 | 38.2 | 28.5 | 5.6 |
| 9 | 9.1 | 3.3 | 26.5 | 27.4 | 33.7 |
| 10 | 17.6 | 11.1 | 40.1 | 27.3 | 3.9 |
| 11 | 10.8 | 17.9 | 34.2 | 25.6 | 11.5 |
| 12 | 8.9 | 7.6 | 33.2 | 28.6 | 21.7 |

The invention claimed is:
1. A catalyst, comprising a metal combination as a core and a porous material as a shell, wherein the metal combination comprises: a first metal component being Co, a second metal component being selected from Ce, La, and Zr, and a third metal component being selected from Pt, Ru, Rh, and Re;

the catalyst comprises: between 10 and 35 wt. % of the first metal component, between 0.5 and 10 wt. % of the second metal component, between 0.02 and 2 wt. % of the third metal component, and the remainder being the porous material functioning as a carrier;

the porous material is a nano silica or alumina;

the carrier is in the shape of a spheroid, and has a pore size of between 1 and 20 nm and a specific area of between 300 and 500 $m^2/g$; and the metal combination has a particle size of between 0.5 and 20 nm.

2. The catalyst of claim 1, comprising: between 15 and 30 wt. % of the first metal component, between 1 and 5 wt. % of the second metal component, and between 0.05 and 2 wt. % of the third metal component, and the remainder being the carrier.

3. The catalyst of claim 2, wherein the carrier has the pore size of between 1 and 10 nm and the specific area of between 300 and 400 $m^2/g$; and the metal combination has the particle size of between 0.5 and 5 nm.

4. The catalyst of claim 2, wherein the carrier has the pore size of between 10 and 15 nm and the specific area of between 400 and 500 $m^2/g$; and the metal combination has the particle size of between 6 and 15 nm.

5. The catalyst of claim 2, wherein the carrier has the pore size of between 10 and 20 nm and the specific area of between 400 and 500 $m^2/g$; and the metal combination has the particle size of between 16 and 20 nm.

6. A method for preparing the catalyst of claim 1, the method comprising:

1) providing tetraethyl orthosilicate (TEOS) or aluminum nitrate, a water-soluble salt containing the first metal component Co, a nitrate or a nitrosyl nitrate containing the second metal component, a nitrate or a nitrosyl nitrate containing the third metal component, and a gel template agent according to the corresponding weight percentages of each component;

2) dissolving the gel template agent in a polar solvent to yield a first solution, adding the water-soluble salt containing the first metal component Co, the nitrate or the nitrosyl nitrate containing the second metal component, and the nitrate or the nitrosyl nitrate containing the third metal component to the first solution at a constant temperature, adding appropriate amount of ammonia to adjust the pH value to between 8 and 10, and stirring at the constant temperature for between 0.1 and 3 hr to yield a second solution;

3) adding TEOS or aluminum nitrate to the second solution and stirring for between 3 and 24 hr at the constant temperature to yield a mixture;

4) spray drying the mixture at a temperature of between 90 and 150° C., thus obtaining an organic-inorganic hybrid material in the form of powder; and 5) transferring the powder after the spray drying to a muffle furnace, calcining the powder at a temperature of between 300 and 753° C. for between 3 and 12 hr, thus yielding the catalyst.

7. The method of claim 6, wherein in step 4), a gel prepared in step 3) is spray dried at the temperature of between 110 and 150° C. to yield the organic-inorganic hybrid material.

8. The method of claim 7, wherein in step 5), the powder is calcined at the temperature of between 350 and 753° C. for between 5 and 10 hr.

9. The method of claim 7, wherein the gel template agent is a linear amphiphilic polymer containing an amino group.

10. The method of claim 7, wherein
the water-soluble salt containing the first metal component Co is cobalt nitrate, cobalt acetate, or cobalt carbonate;
the salt containing the second metal component is a nitrate thereof; and
the salt containing the third metal component is a nitrate thereof.

11. The method of claim 6, wherein in step 5), the powder is calcined at the temperature of between 350 and 753° C. for between 5 and 10 hr.

12. The method of claim 6, wherein the gel template agent is a linear amphiphilic polymer containing an amino group.

13. The method of claim 6, wherein
the water-soluble salt containing the first metal component Co is cobalt nitrate, cobalt acetate, or cobalt carbonate;
the salt containing the second metal component is a nitrate thereof; and
the salt containing the third metal component is a nitrate thereof.

* * * * *